United States Patent
Shin et al.

(10) Patent No.: US 11,575,897 B2
(45) Date of Patent: Feb. 7, 2023

(54) IMAGE PROCESSING APPARATUS AND OPERATION METHOD FOR LEARNING PARAMEIERS BASED ON MACHINE LEARNING

(71) Applicant: PIXTREE Co., Ltd., Seoul (KR)

(72) Inventors: Jaeseob Shin, Seoul (KR); Sungul Ryoo, Seoul (KR); Sehoon Son, Seoul (KR); Hyeongduck Kim, Gyeonggi-do (KR); Hyosong Kim, Seoul (KR)

(73) Assignee: PIXTREE Co., Ltd.

( * ) Notice: Subject to any disclaimer, the term of this patent is extended or adjusted under 35 U.S.C. 154(b) by 0 days.

(21) Appl. No.: 17/413,947

(22) PCT Filed: Nov. 29, 2019

(86) PCT No.: PCT/KR2019/016719
§ 371 (c)(1),
(2) Date: Jul. 23, 2021

(87) PCT Pub. No.: WO2020/122481
PCT Pub. Date: Jun. 18, 2020

(65) Prior Publication Data
US 2022/0086442 A1      Mar. 17, 2022

(30) Foreign Application Priority Data

Dec. 13, 2018 (KR) ........................ 10-2018-0161366

(51) Int. Cl.
*H04N 19/124*   (2014.01)
*H04N 19/172*   (2014.01)
(Continued)

(52) U.S. Cl.
CPC .......... *H04N 19/124* (2014.11); *G06N 20/00* (2019.01); *H04N 19/172* (2014.11); *H04N 19/80* (2014.11); *H04N 19/91* (2014.11); *H04N 21/236* (2013.01)

(58) Field of Classification Search
None
See application file for complete search history.

(56) References Cited

U.S. PATENT DOCUMENTS

2015/0237365 A1 * 8/2015 Takahashi .............. H04N 19/58
                                                           375/240.16
2018/0139450 A1   5/2018 Gao et al.
(Continued)

FOREIGN PATENT DOCUMENTS

KR    20180001428 A    1/2018
KR    20180052651 A    5/2018
(Continued)

*Primary Examiner* — Stuart D Bennett
(74) *Attorney, Agent, or Firm* — Renaissance IP Law Group LLP

(57) ABSTRACT

The present disclosure relates to a technical idea of compensating for degradation of an image quality during compression in an encoding process by using a parameter trained based on machine learning within a codec. An image processing apparatus includes an input frame buffer configured to store an input original frame, an encoding processor configured to encode the stored original frame, an output stream buffer configured to output the encoded original frame as an output stream for multiplexing, and a multiplexing processor configured to control the output stream to be multiplexed and transmitted. The encoding processor outputs a filter parameter trained based on machine learning using the stored original frame and a restored frame obtained by the encoding. A device on a decoding side decodes the output stream by using the output filter parameter.

13 Claims, 6 Drawing Sheets

(51) Int. Cl.
    *H04N 19/80*     (2014.01)
    *H04N 19/91*     (2014.01)
    *G06N 20/00*     (2019.01)
    *H04N 21/236*     (2011.01)

(56) References Cited

U.S. PATENT DOCUMENTS

| | | | |
|---|---|---|---|
| 2019/0230354 A1* | 7/2019 | Kim | G06F 17/15 |
| 2021/0021820 A1* | 1/2021 | Ikai | G06N 3/063 |
| 2021/0056390 A1* | 2/2021 | Chen | H04N 19/439 |

FOREIGN PATENT DOCUMENTS

| | | |
|---|---|---|
| KR | 20180108288 A | 10/2018 |
| KR | 20180119753 A | 11/2018 |

\* cited by examiner

IMAGE PROCESSING APPARATUS AND OPERATION METHOD FOR LEARNING PARAMEIERS BASED ON MACHINE LEARNING

TECHNICAL FIELD

The present disclosure relates to a technical idea of compensating for image quality degradation that occurs in a compression process during encoding by using a parameter trained based on machine learning performed inside a codec.

BACKGROUND ART

When a video, an image, or sound data is generated, encoding and compressing data to reduce the amount of original data is called encoding.

Encoding may be performed in the process of transmitting an image to a remote location, and the remote location decodes and restores the encoded data.

During encoding, information loss occurs due to compression in most cases. Accordingly, a decoded image has a quality lower than that of an original frame in view of the loss.

In order to prevent loss-incurred quality degradation, various methods of decoding an image to the level of an original image are currently being proposed.

Nonetheless, a technique of decoding an image to the level of a quality close to that of an original frame without significantly increasing an image encoding or decoding time is yet to be developed. Along with the recent increase of the resolution of TVs and distribution of high-quality content, the demands for reduction of quality deterioration involved in encoding and decoding are also increasing.

PRIOR ART LITERATURE (Patent Document 1) Korean Patent No. 10-1803471, "Deep learning system using image patterning based on convolutional neural network, and image learning method using the same"
(Patent Document 2) Korean Patent No. 10-1906796, "Deep learning-based image analysis apparatus and image analysis method"
(Patent Document 3) Korean Patent Laid-Open No. 10-2017-0070715, "Deep learning-based image processing apparatus and method, and learning apparatus"

DETAILED DESCRIPTION

Technical Problem

An aspect of the present disclosure is to compensate for deterioration of an image quality that occurs during encoding by using a parameter trained based on machine learning performed inside a codec.

Another aspect of the present disclosure is to train a parameter through machine learning performed inside a codex during encoding and decoding.

Technical Solution

According to an embodiment, an image processing apparatus includes an input frame buffer configured to store an input original frame, an encoding processor configured to encode the stored original frame, an output stream buffer configured to output the encoded original frame as an output stream for multiplexing, and a multiplexing processor configured to control the output stream to be multiplexed and transmitted. The encoding processor outputs a filter parameter trained based on machine learning using the stored original frame and a restored frame obtained by the encoding, and a device on a decoding side decodes the output stream by using the output filter parameter.

According to an embodiment, the multiplexing processor may process the output parameter and the multiplexed output stream to be transmitted in association with each other to the decoding side.

According to an embodiment, the encoding processor may include a predictor configured to reflect adjacent feature information within a reference distance as prediction information in the stored original frame, a forward processor configured to transform and quantize the frame with the prediction information reflected therein, an entropy encoder configured to entropy-encode and output the transformed and quantized frame, an inverse processor configured to generate a restored frame corresponding to the original frame by inverse-transforming and inverse-quantizing the transformed and quantized frame, and a machine learning in-loop filter unit configured to output a filtered restored frame and a trained filter parameter by receiving the original frame stored in the input frame buffer and the generated restored frame and subjecting the original frame and the restored frame to machine learning inference. The output restored frame may be reflected in the prediction information, and the output filter parameter may be transmitted to the decoding side.

According to an embodiment, the machine learning in-loop filter unit may include a first machine learning inferer configured to perform the machine learning inference by initializing the output restored frame with a pre-trained filter parameter, an error backpropagator configured to calculate an error value by comparing the restored frame subjected to machine learning inference with the input original frame, backpropagate the calculated error value to the machine learning inferer according to a predetermined criterion to request the machine learning inferer to update the pre-trained filter parameter by performing the machine learning inference again, and output the updated filter parameter, and a second machine learning inferer configured to filter the restored frame by machine learning inference based on the output filter parameter.

According to an embodiment, the machine learning in-loop filter unit may further include a training sub-image divider configured to divide at least one of the restored frame or the original frame into a plurality of sub-images. The first machine learning inferer may initialize each of a plurality of sub-images divided from the restored frame and subject the initialized sub-images to machine learning inference, and the error backpropagator may calculate an error value by comparing a plurality of sub-images divided from the original frame with the plurality of sub-images divided from the restored frame.

According to an embodiment, an image processing apparatus includes a demultiplexing processor configured to extract an input stream and a filter parameter by demultiplexing an input stream received from an encoding device, an input stream buffer configured to store the extracted input stream, a decoding processor configured to generate an output frame by decoding the stored input stream, and an output frame buffer configured to store the generated output frame. The decoding processor generates the output frame processed to have an improved image quality by applying the extracted filter parameter to a restored frame, and the encoding device multiplexes and transmits the filter parameter trained based on machine learning using the stored original frame and a restored frame obtained by encoding the original frame.

According to an embodiment, the decoding processor may include an entropy decoding processor configured to entropy-decode and output the received input stream, an inverse processor configured to inverse-quantize and inverse-transform the entropy-decoded stream, and a machine learning in-loop filter unit configured to receive the inverse-quantized and inverse-transformed stream, a stream obtained by reflecting prediction information in the inverse-quantized and inverse-transformed stream, and the entropy-decoded stream and subject the received streams to machine learning in-loop-based filtering.

According to an embodiment, the machine learning in-loop filter unit may include a parameter information decoding processor configured to decoder the filter parameter, a parameter decider configured to select a filter parameter for machine learning in consideration of the difference between the extracted filter parameter and a pre-trained filter parameter, and a machine learning inferer configured to process the restored frame stored in a restored frame buffer to have an improved image quality by applying the selected filter parameter to the restored frame.

According to an embodiment, a method of operating an image processing apparatus includes storing an input original frame by an input frame buffer, encoding the stored original frame by an encoding processor, outputting the encoded original frame as an output stream for multiplexing by an output stream buffer, and controlling the output stream to be multiplexed and transmitted by a multiplexing processor. The encoding includes outputting a filter parameter trained based on machine learning using the stored original frame and a restored frame obtained by the encoding, and a device on a decoding side decodes the output stream by using the output filter parameter.

According to an embodiment, the encoding may include reflecting adjacent feature information within a reference distance as prediction information in the stored original frame, transforming and quantizing the frame with the prediction information reflected therein, entropy-encoding and outputting the transformed and quantized frame, generating a restored frame corresponding to the original frame by inverse-transforming and inverse-quantizing the transformed and quantized frame, and outputting a filtered restored frame and a trained filter parameter by receiving the original frame stored in the input frame buffer and the generated restored frame and subjecting the original frame and the restored frame to machine learning inference. The output restored frame may be reflected in the prediction information, and the output filter parameter may be transmitted to the decoding side.

According to an embodiment, the outputting of a filtered restored frame and a trained filter parameter may include performing the machine learning inference by initializing the output restored frame with a pre-trained filter parameter, calculating an error value by comparing the restored frame subjected to machine learning inference with the input original frame, requesting update of the pre-trained filter parameter through machine learning inference again by backpropagating the calculated error value according to a predetermined criterion; outputting the updated filter parameter, and filtering the restored frame by machine learning inference based on the output filter parameter.

Advantageous Effects

According to an embodiment, image quality deterioration that occurs during encoding may be compensated for by using a parameter trained based on machine learning.

According to an embodiment, a parameter may be trained through machine learning in real time during encoding and decoding.

BEST MODE

Figure 1:
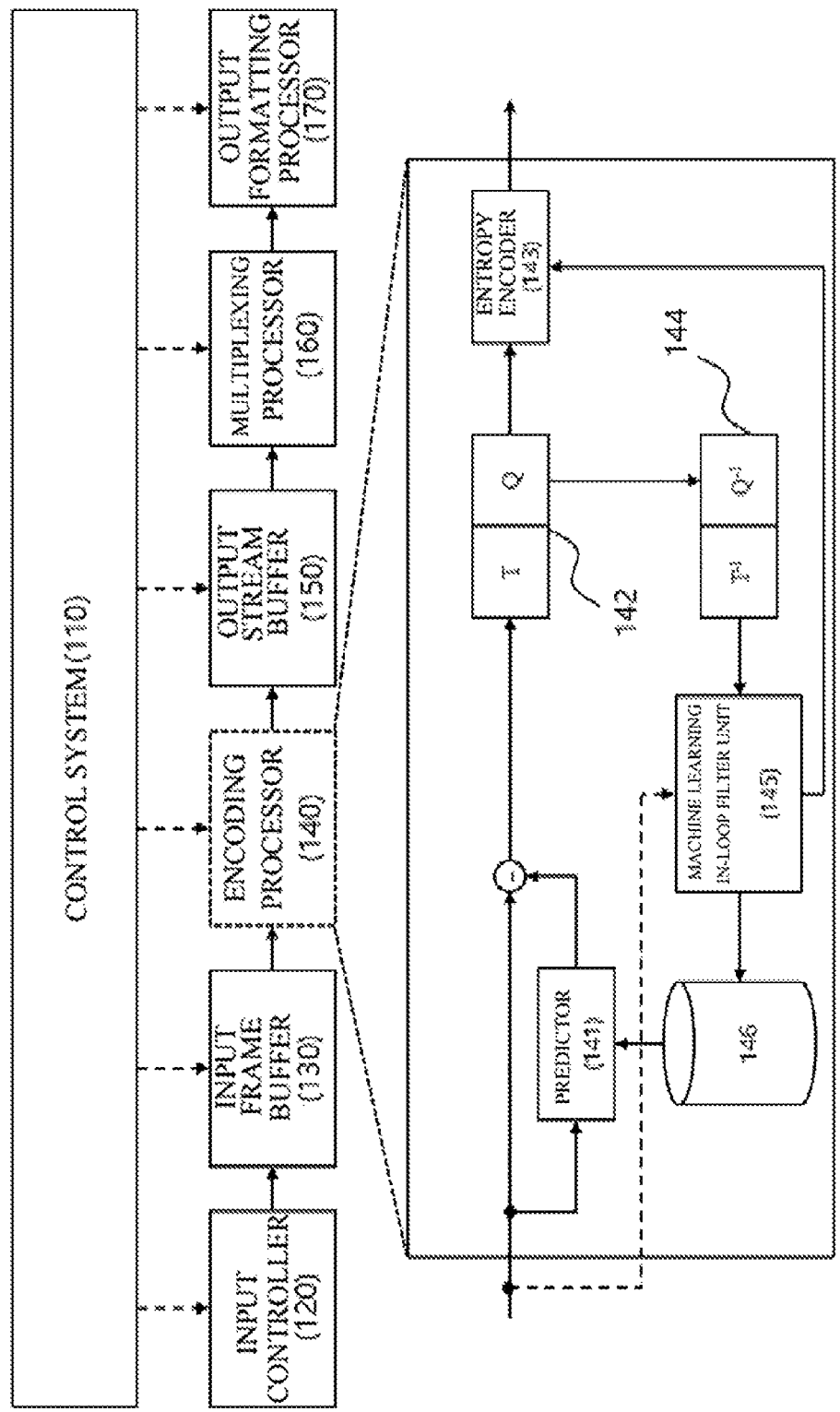
FIG. 1 is a block diagram illustrating an encoding system in an image processing apparatus according to an embodiment.

Specific structural or functional descriptions of the embodiments according to the concept of the present disclosure are only exemplified for the purpose of explaining the embodiments according to the concept of the present disclosure, and embodiments according to the concept of the present disclosure may be implemented in various forms and are not limited to the embodiments described herein.

Since the embodiments according to the concept of the present disclosure may have various changes and may have various forms, the embodiments will be illustrated in the drawings and described in detail herein. However, the embodiments and terms used herein are not intended to limit the technical scope of the disclosure, and it is to be understood that the present disclosure covers various modifications, equivalents, and/or alternatives.

The term as used in the disclosure, "1st", "2nd", "first" or "second" may be used for the names of various components irrespective of sequence and/or importance, not limiting the components. These expressions are used to distinguish one component from another component. For example, a first component may be referred to as a second component and vice versa without departing the scope of the disclosure.

When it is said that a component is "coupled with/to" or "connected to" another component, it should be understood that the one component is connected to the other component directly or through any other component. On the other hand, when it is said that a component is "directly connected to" or "directly coupled to" another component, it may be understood that there is no other component between the components. Expressions describing the relationship between components, for example, "between" and "between" or "directly adjacent to" should be interpreted similarly.

The terms as used in the disclosure are provided to describe merely specific embodiments, not intended to limit the scope of other embodiments. It is to be understood that singular forms include plural referents unless the context clearly dictates otherwise. In the disclosure, the term "have", "may have", "include", or "may include" signifies the presence of a corresponding feature, number, step, operation, component, or part, not excluding the presence of one or more other features, numbers, steps, operations, components, or parts.

The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Embodiments will be described in detail with reference to the accompanying drawings. However, the scope of the patent application is not restricted or limited by these embodiments. With regard to the drawings, like reference numerals denote the same components.

While the concept of the present disclosure is described based on conventional machine learning, this may be interpreted as various learning techniques such as deep learning or convolutional neural networks.

FIG. 1 is a block diagram illustrating an encoding system in an image processing apparatus according to an embodiment.

An image processing apparatus 100 according to an embodiment may compensate for image quality degradation during encoding by using a parameter trained based on machine learning performed inside a codec. Further, the parameter may be trained through machine learning during encoding and decoding.

For this purpose, the image processing apparatus 100 according to an embodiment may include at least some of an input controller 120, an input frame buffer 130, an encoding processor 140, an output stream buffer 150, a multiplexing processor 160, and an output formatting processor 170, which operate under the control of a control system 110.

The input controller 120 according to an embodiment may control an input original frame to be stored in the input frame buffer 130.

The encoding processor 140 may encode the stored original frame. During the encoding, general known encoding algorithms may be applied.

The output stream buffer 150 may store the encoded original frame and provide the encoded original frame to the multiplexing processor 160, for multiplexing prior to output.

The multiplexing processor 160 may multiplex encoded audio information, image information, and meta information, and the output formatting processor 170 may process the multiplexed information into a format suitable for output.

For example, the multiplexing processor 160 may request the output formatting processor 170 to transmit an output filter parameter and the multiplexed output stream in association with each other to a decoding side.

The encoded original frame stored in the output stream buffer 150 may be decoded by a local decoding processor which is located locally. The local decoding processor may also function as a local decoder located on an encoding side in order to refer to an adjacent frame during frame encoding.

The encoding processor 140 according to an embodiment may output a filter parameter trained based on machine learning using the stored original frame and a frame restored after the encoding. Further, a decoding device may decode the output stream by using the output filter parameter.

More specifically, the encoding processor 140 may include a predictor 141, a forward processor 142, an entropy encoder 143, an inverse processor 144, a machine learning in-loop filter unit 145, and a feature buffer 146.

The predictor 141 may reflect adjacent feature information with a reference distance as prediction information in the stored original frame.

Further, the forward processor 142 may transform and quantize the frame in which the prediction information has been reflected.

The entropy encoder 143 may output the transformed and quantized frame after entropy encoding.

The inverse processor 144 may generate a restored frame corresponding to the original frame by performing inverse quantization and inverse transformation on the transformed and quantized frame.

The machine learning in-loop filter unit 145 may receive the original frame stored in the input frame buffer and the generated restored frame, perform machine learning inference, and output the filtered restored frame and a trained filter parameter. The machine learning in-loop filter unit 145 will be described in detail later with reference to FIG. 2.

The feature buffer 146 may operate as a buffer and store the filtered restored frame.

The output restored frame may be reflected in the prediction information, and the output filter parameter may be transmitted to a decoding side.

The present disclosure may be applied within a codec. That is, an image quality may be improved by applying machine learning within the codec.

Particularly, to use adjacent features as the next prediction, the encoding processor 140 may restore the frame through inverse transformation and inverse quantization, record the restored frame in the feature buffer 146, and then use the pre-stored restored frame previously stored as a prediction for the next frame.

This operation may facilitate use of the restored frame for the next prediction by filtering the restored frame.

As a similar technique, a blocking filter is introduced to H.264, and there is an SAO pixel-based fine-tuning algorithm in HEVC.

In the present disclosure, these may be replaced with the machine learning in-loop filter unit 145, which is a machine learning-based filter.

In the presence of a restored frame, the machine learning in-loop filter unit 145 may train a filter that converts the restored frame into the original frame before the image quality is distorted by encoding, based on machine learning.

The machine learning in-loop filter unit 145 may train a filter that minimizes the difference between the filter of the original frame and the filter of the restored frame, and transmit the trained parameter to the entropy encoder 143.

The filtered feature to which the machine learning in-loop filter is applied is stored in the feature buffer 146 and may be used as a feature for predicting the next frame.

As a result, the image processing apparatus according to the present disclosure may increase the encoding efficiency of the entire system.

Figure 2:
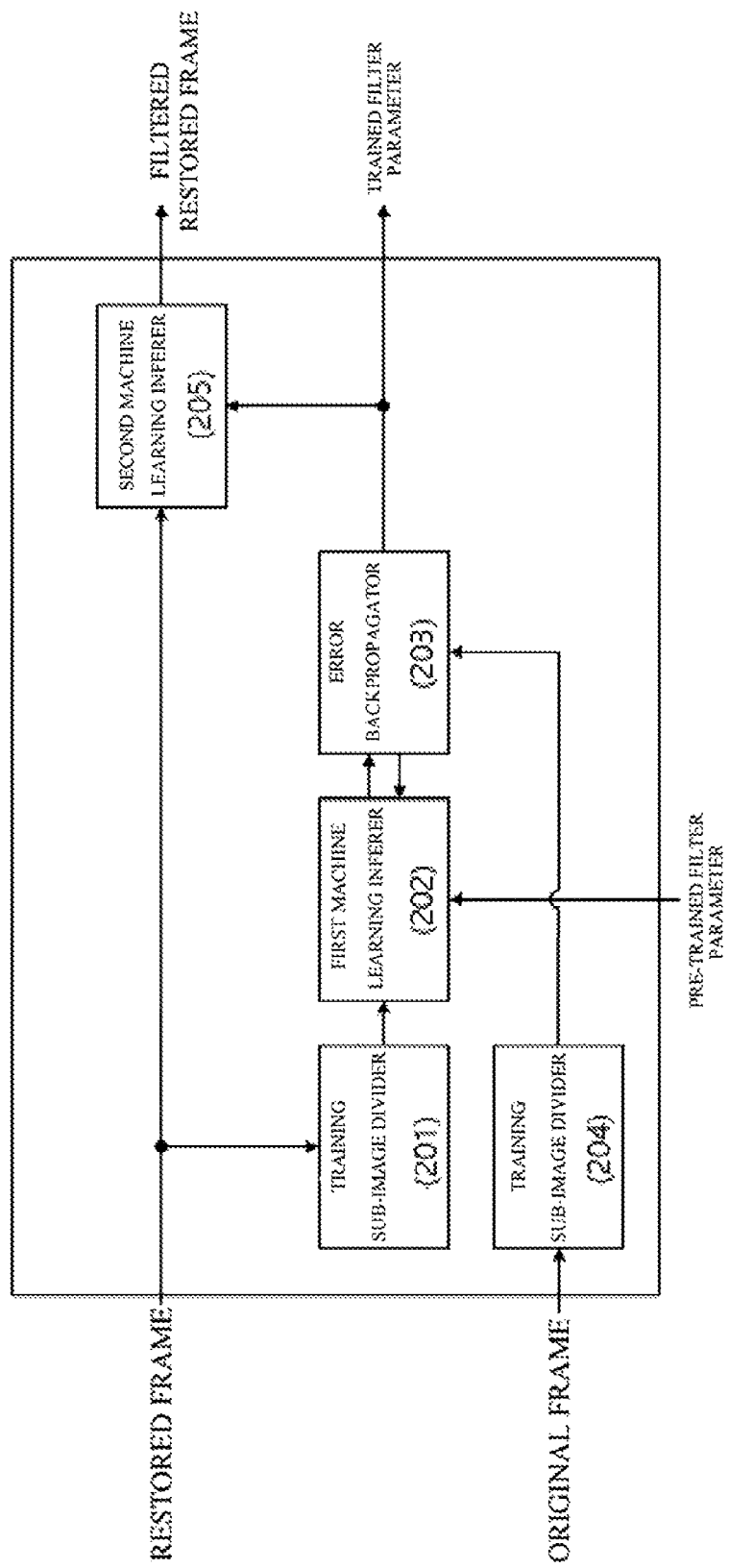
FIG. 2 is a detailed block diagram illustrating a machine learning in-loop filter unit according to an embodiment.

FIG. 2 is a detailed block diagram illustrating a machine learning processor 200 according to an embodiment.

The machine learning in-loop filter unit 200 according to an embodiment may include a first machine learning inferer 202, an error backpropagator 203, and a second machine learning inferer 205.

The first machine learning inferer 202 according to an embodiment may initialize an output restored frame with a pre-trained filter parameter to perform machine learning inference.

The error backpropagator 203 according to an embodiment may calculate an error value by comparing the machine learning inferred restored frame with the input original frame, and backpropagate the calculated error value to the machine learning inferer 202 according to a predetermined criterion, so that the machine learning inferer 202 updates the pre-trained filter parameter by performing machine learning inference again. Further, the error backpropagator 203 may output the updated filter parameter.

Further, the second machine learning inferer 205 may perform machine learning inference on the input restored frame by using the filter parameter output from the error backpropagator 203, and filter the restored frame to output the filtered restored frame.

The machine learning in-loop filter unit 200 according to an embodiment may include a training sub-image divider 201 as an optional component, which divides the restored frame into a plurality of frames in consideration of the size of the input restored frame. Further, the machine learning in-loop filter unit 200 may include a training sub-image divider 204 that divides the original frame into a plurality of frames in consideration of the size of the input original frame.

Figure 3:
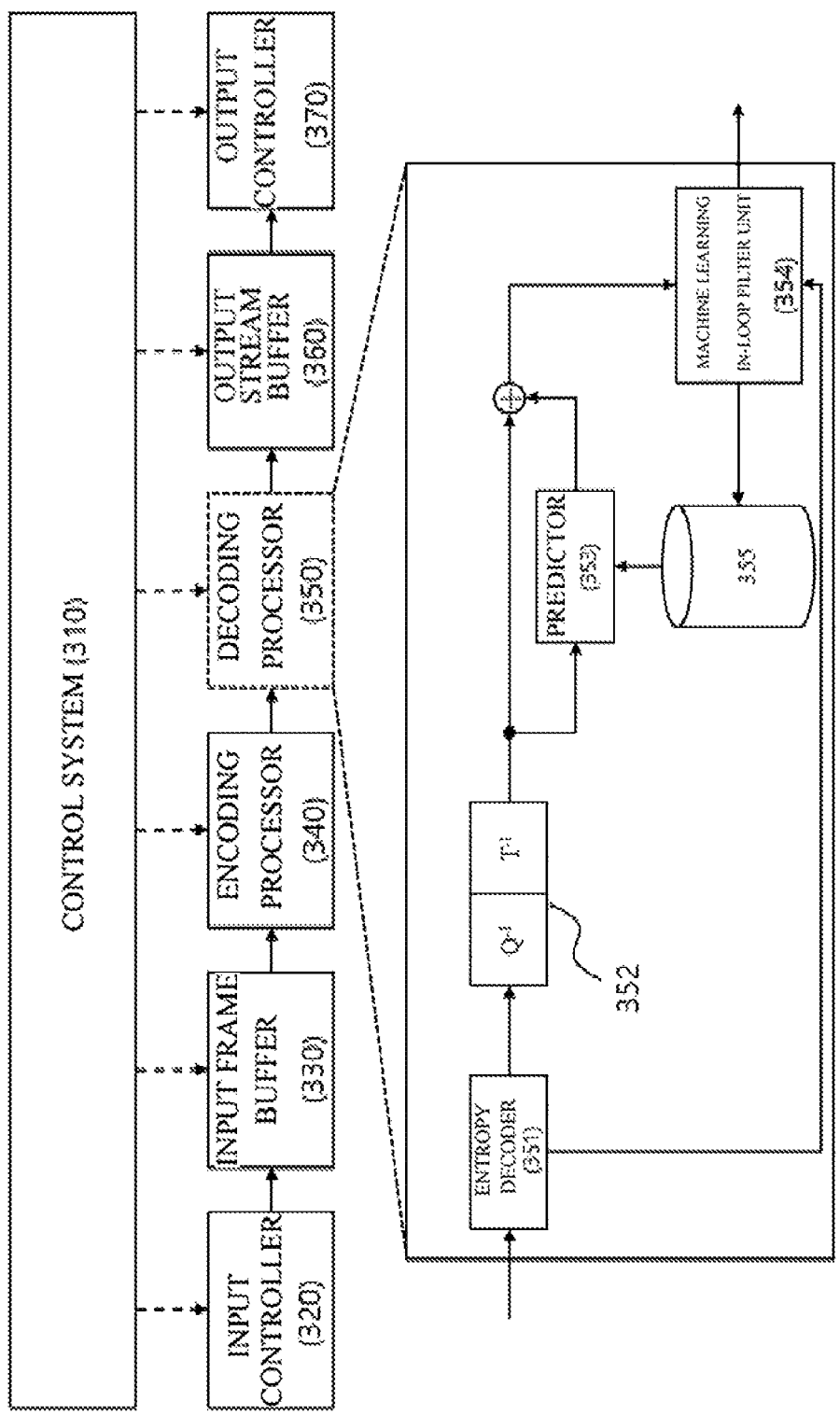
FIG. 3 is a block diagram illustrating a decoding system in an image processing apparatus according to an embodiment.

FIG. 3 is a block diagram illustrating a decoding system in an image processing apparatus according to an embodiment.

An image processing apparatus 300 according to an embodiment may compensate for image quality degradation during encoding by a parameter trained based on machine learning performed within a codec, and may train a parameter based on real-time machine learning during encoding and decoding.

For this purpose, the image processing apparatus 300 according to an embodiment may include an input controller 320, a demultiplexing processor 330, an input stream buffer 340, and a decoding processor 350, which operate under the control of a control system 310.

The input controller 320 according to an embodiment may control an input stream received from the encoder to be provided as an input of the demultiplexing processor 330.

The demultiplexing processor 330 may demultiplex the input stream received from the encoding device to extract an input stream and filter parameter information.

The filter parameter information may include an updated parameter or a difference value between a pre-trained filter parameter and an updated filter parameter.

The input stream buffer 340 may store the extracted input stream.

The decoding processor 350 may generate a restored frame by decoding the stored input stream and store the restored frame in the restored frame buffer 360.

The decoding processor 350 according to an embodiment may improve the quality of the input stream to an original level. For example, the decoding processor 350 may generate an output frame processed to have an improved image quality by applying the extracted filter parameter to the restored frame.

Specifically, the decoding processor 350 may include an entropy decoder 351, an inverse processor 352, a predictor 353, and a machine learning in-loop filter unit 354.

The entropy decoder 351 may output a received input stream after entropy decoding.

The inverse processor 352 may inverse-quantize and inverse-transform the entropy-decoded stream.

The predictor 353 may apply a feature to the stream by using the stored feature.

The machine learning in-loop filter unit 354 may receive the inverse-quantized and inverse-transformed stream, a stream obtained by reflecting prediction information in the inverse-quantized and inverse-transformed stream, and the stream output after entropy decoding, and improve an image quality by subjecting the received streams to machine learning in-loop-based filtering.

The machine learning in-loop filter unit 354 will be described in more detail with reference to FIG. 4.

Figure 4:
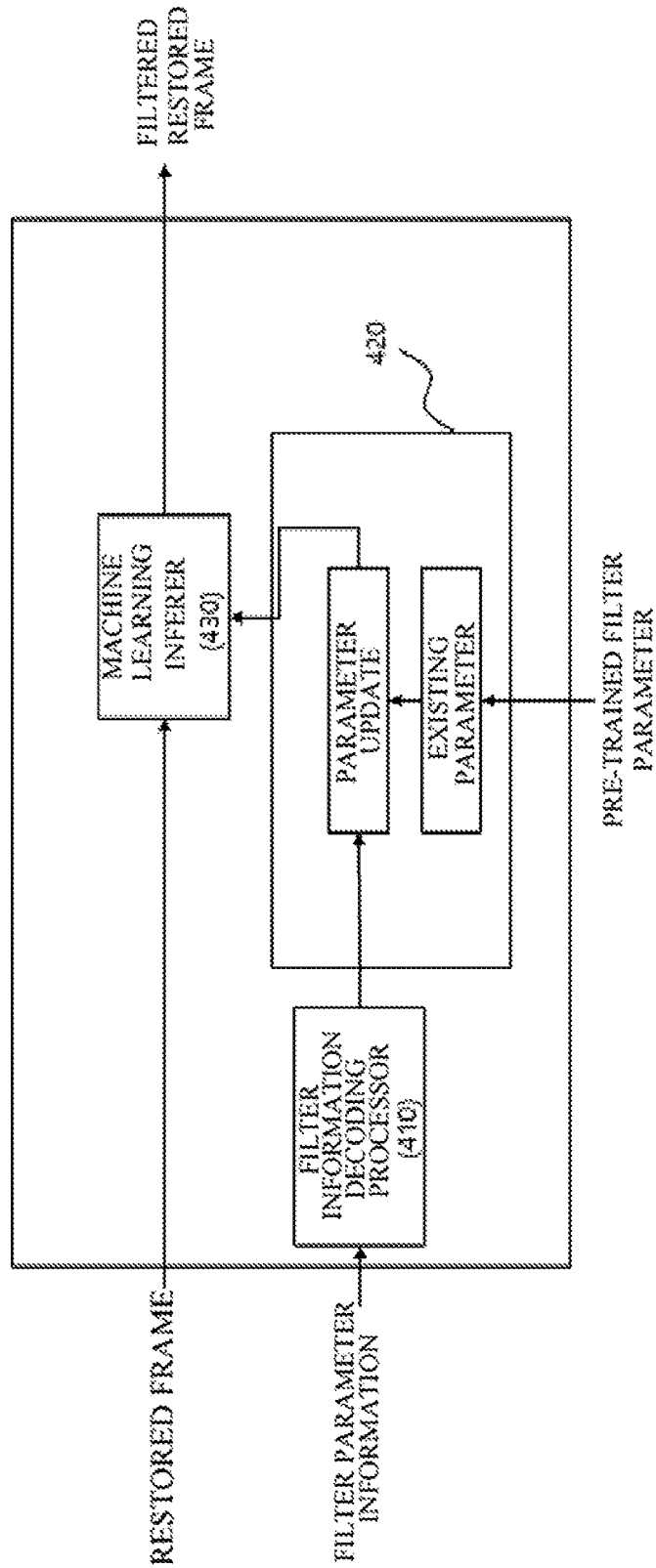
FIG. 4 is a block diagram illustrating a machine learning in-loop filter unit according to another embodiment.

FIG. 4 is a block diagram illustrating a machine learning in-loop filter unit 400 according to an embodiment.

The machine learning in-loop filter unit 400 according to an embodiment may include a parameter information decoding processor 410, a parameter decider 420, and a machine learning inferer 430.

The parameter information decoding processor 410 according to an embodiment may extract a filter parameter by decoding filter parameter information. The filter parameter information according to the present disclosure may be an updated filter parameter or information about a difference between a pre-calculated filter parameter and the updated filter parameter.

The parameter decider 420 according to an embodiment may select a filter parameter for machine learning in consideration of the difference between the extracted filter parameter and the pre-trained filter parameter.

Further, the machine learning inferer 430 according to an embodiment may apply the selected filter parameter to a restored frame stored in a selected restored frame buffer.

As a result, the machine learning inferer 430 may improve the image quality of the restored frame by outputting the filtered restored frame.

Figure 5:
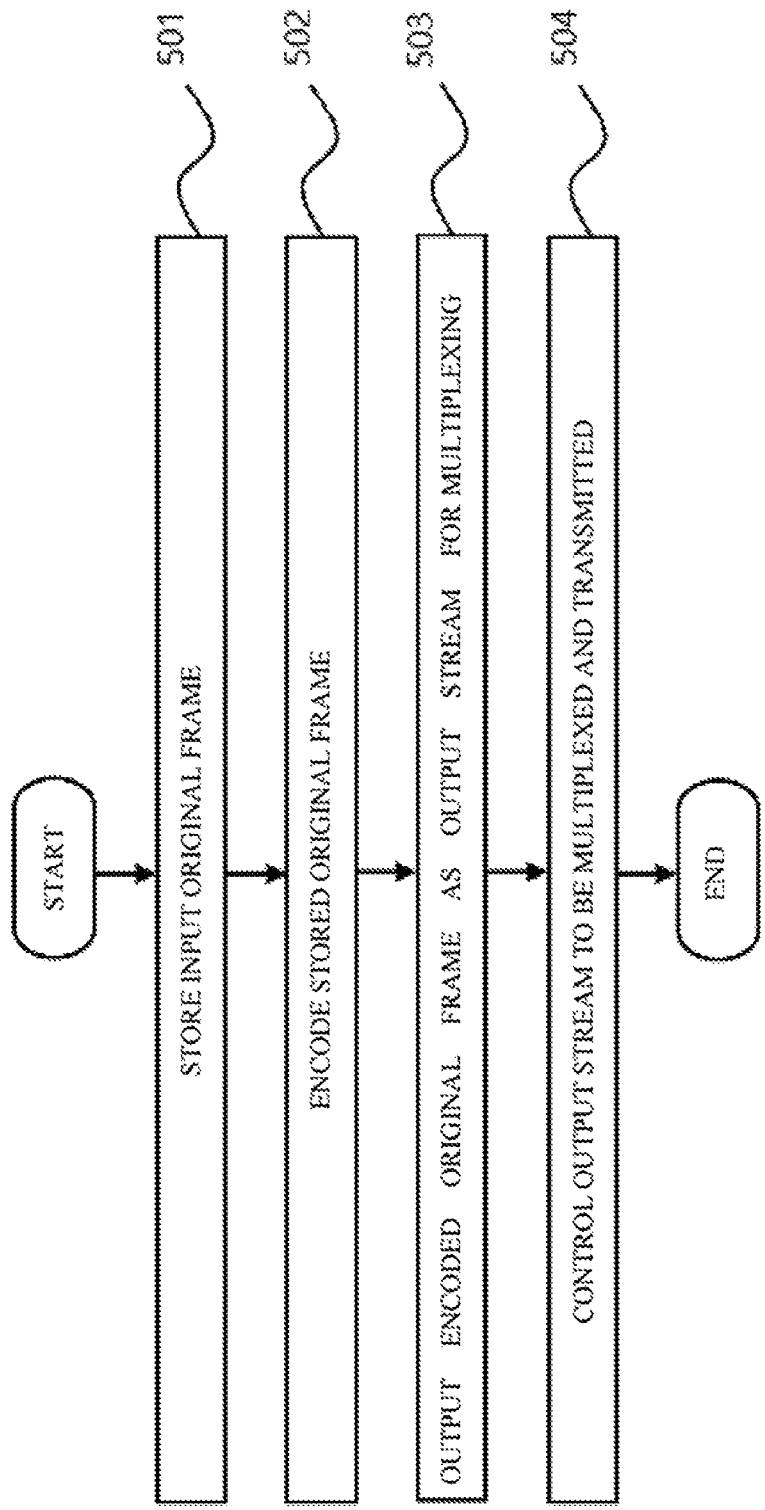
FIG. 5 is a flowchart illustrating a method of operating an image processing apparatus according to an embodiment.

FIG. 5 is a flowchart illustrating a method of operating an image processing apparatus according to an embodiment.

In the method of operating an image processing apparatus according to an embodiment, an input original frame may be stored in step 501 and encoded in step 502.

Particularly in the method of operating an image processing apparatus according to an embodiment, a filter parameter trained based on machine learning using the stored original frame and a frame restored after the encoding improvement may be output in consideration of decoding for image quality.

Further, in the method of operating an image processing apparatus, the encoded original frame may be output as an output stream for multiplexing through the output stream buffer in step 503, and the output stream may be multiplexed through the multiplexing processor and transmitted in step 504.

A decoding device may decode the output stream using the output filter parameter to output an image having a level similar to that of the original frame.

Figure 6:
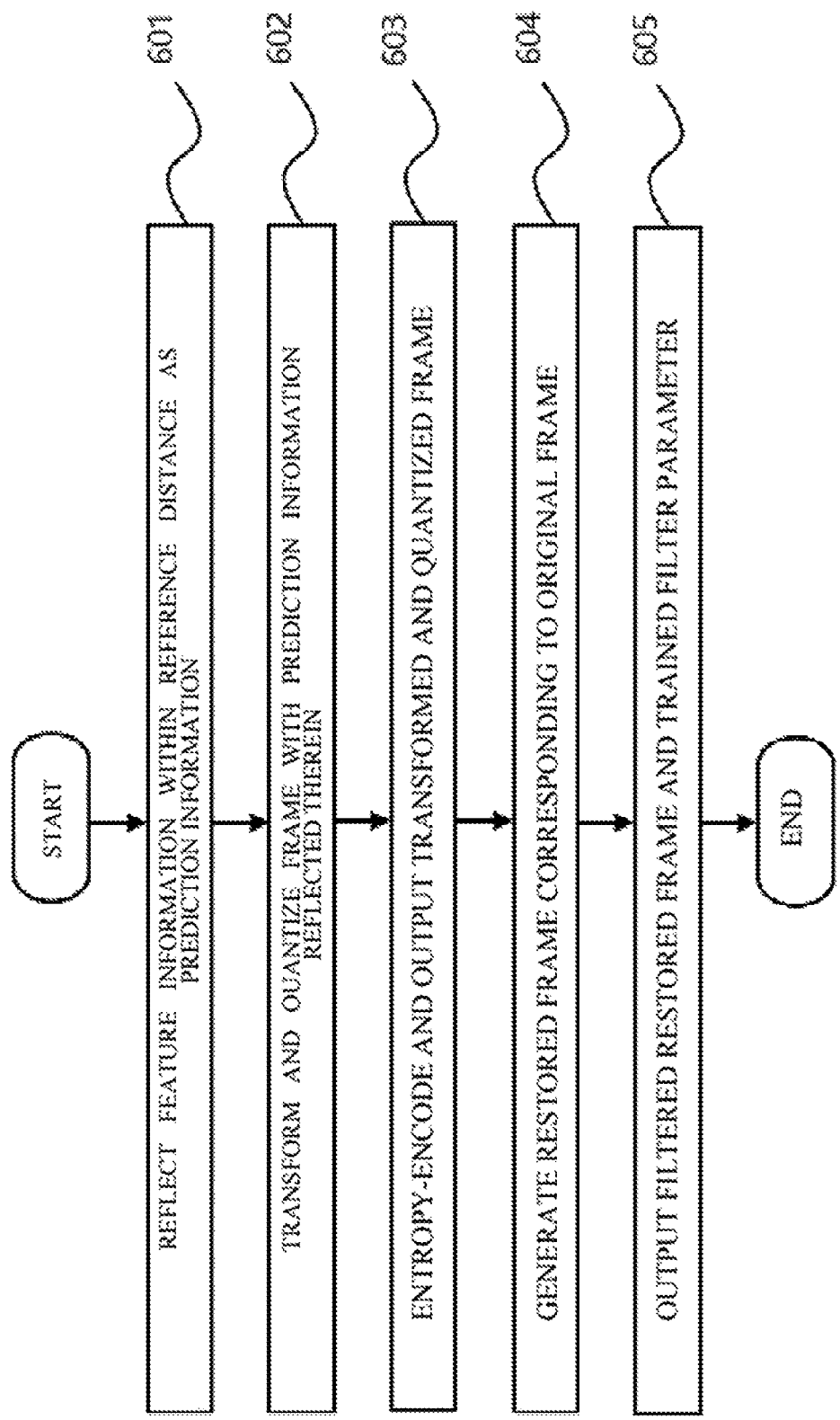
FIG. 6 is a detailed flowchart illustrating encoding in the method of operating an image processing apparatus according to an embodiment.

FIG. 6 is a detailed flowchart illustrating encoding in the method of operating an image processing apparatus according to an embodiment.

In the method of operating an image processing apparatus according to an embodiment, feature information adjacent to a stored original frame within a reference distance may be reflected as prediction information in the original frame in step 601.

In the method of operating an image processing apparatus, the frame in which the prediction information is reflected may be transformed and quantized in step 602.

In the method of operating an image processing apparatus, the transformed and quantized frame may be output after entropy coding in step 602.

Further, in the method of operating an image processing apparatus, a restored frame corresponding to the original frame may be generated by performing inverse quantization and inverse transformation on the transformed and quantized frame in step 603.

In the method of operating an image processing apparatus, the original frame stored in the input frame buffer and the generated restored frame may be received and subjected to machine learning inference to output a filtered restored frame and a trained filter parameter in step 604.

Particularly in the method of operating an image processing apparatus, an error value may be calculated to output the trained filter parameter.

More specifically, in the method of operating an image processing apparatus, the output restored frame may be initialized with a pre-learned filter parameter and subjected to machine learning inference, and the error value may be calculated by comparing the restored frame subjected to machine learning inference with the input original frame. In addition, in the method of operating an image processing apparatus, the calculated error value may be backpropagated according to a predetermined criterion to request update of the pre-trained filter parameter by machine learning inference again.

As a result, in the method of operating an image processing apparatus, the updated filter parameter may be output and used in machine learning inference and filtering of the restored frame.

Further, the output restored frame may be reflected in prediction information, and the output filter parameter may be transmitted to the decoding side.

It may be concluded that degradation of an image quality during encoding may be compensated for by using a parameter trained based on machine learning in the present disclosure. Further, the parameter may be trained through real-time machine learning during encoding and decoding.

The above-described apparatus may be implemented as a hardware component, a software component, and/or a combination of the hardware component and the software component. For example, apparatuses and components described in the embodiments may be implemented by one or more general-purpose computers or special-purpose computers including, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications running on the OS. The processing device may also access, store, manipulate, process, and generate data in response to execution of the software. For convenience of understanding, although it has been described that one processing device is used, those skilled in the art will understand that the processing device includes a plurality of processing elements and/or a plurality of types of processing elements. For example, the processing device may include a plurality of processors or one processor and one controller. Other processing configurations are also possible, such as parallel processors.

Software may include a computer program, code, instructions, or a combination of one or more of them, which configures a processing device to operate as desired or independently or collectively command the device. Software and/or data may be embodied permanently or temporarily in any kind of machine, component, physical device, virtual equipment, computer storage medium or device, or transmission signal wave to be interpreted by the processing device or to provide instructions or data to the processing device. Software may be distributed over networked computer systems and stored or executed in a distributed manner. Software and data may be stored in one or more computer-readable recording media.

The method according to the embodiments may be implemented in the form of program instructions that can be executed through various computer means and recorded in a computer-readable medium. The computer-readable medium may include program instructions, data files, data structures, etc. alone or in combination. The program instructions recorded on the medium may be specially designed and configured for the embodiment, or may be known and available to those skilled in the art of computer software. Examples of the computer-readable recording medium include magnetic media such as hard disks, floppy disks, and magnetic tapes, optical media such as CD-ROMs and DVDs, and magneto-optical media such as floptical disk, and hardware devices specially configured to store and execute program instructions, such as ROM, RAM, flash memory, and the like. Examples of program instructions include not only machine language codes such as those generated by a compiler, but also premium language codes that can be executed by a computer using an interpreter or the like. The hardware devices described above may be configured to operate as one or more software modules to perform the operations of the embodiments, and vice versa.

While the embodiments have been described above with reference to the limited drawings, various modifications and variations can be made by those skilled in the art. For example, an appropriate result may be achieved by performing the described techniques in an order different from the described method, and/or combining the described components of the system, structure, apparatus, circuit, and so on in a different manner from in the described method or replacing them with other components or equivalents.

Therefore, other implementations, other embodiments, and equivalents to the claims also fall within the scope of the following claims.

The invention claimed is:

1. An image processing apparatus comprising:
    an input frame buffer configured to store an input original frame;
    an encoding processor configured to encode the stored original frame;
    an output stream buffer configured to output the encoded original frame as an output stream for multiplexing; and
    a multiplexing processor configured to control the output stream to be multiplexed and transmitted,
    wherein the encoding processor includes a machine learning in-loop filter unit configured to train a filter that converts a restored frame into the original frame before an image quality is distorted by encoding process, based on machine learning,
    wherein the machine learning in-loop filter unit trains a filter parameter that minimizes differences between the original frame and the restored frame based on the machine learning performed by a codec in the encoding process and transmit directly the trained filter parameter to an entropy encoder in the encoding processor,
    wherein the encoding processor outputs a filter parameter trained based on the machine learning performed by the codec in the encoding process using the stored original frame and the restored frame obtained by the encoding, and wherein a device on a decoding side decodes the output stream by using the output filter parameter.

2. The image processing apparatus according to claim 1, wherein the multiplexing processor processes the output parameter and the multiplexed output stream to be transmitted in association with each other to the decoding side.

3. The image processing apparatus according to claim 1, wherein the encoding processor comprises:
a predictor coupled to the input frame buffer and configured to reflect adjacent feature information within a reference distance as prediction information in the stored original frame;
a forward processor coupled to the predictor and configured to transform and quantize the frame with the prediction information reflected therein;
an entropy encoder coupled to the forward processor and configured to entropy-encode and output the transformed and quantized frame; and
an inverse processor coupled to the forward processor and configured to generate a restored frame corresponding to the original frame by inverse-transforming and inverse-quantizing the transformed and quantized frame, and
wherein the machine learning in-loop filter unit coupled to the inverse processor and configured to output the filtered restored frame and a trained filter parameter by receiving the original frame stored in the input frame buffer and the generated restored frame and subjecting the original frame and the restored frame to machine learning inference, and
wherein the output restored frame is reflected in the prediction information, and the output filter parameter is transmitted to the decoding side.

4. The image processing apparatus according to claim 3, wherein the machine learning in-loop filter unit comprises:
a first machine learning inferer coupled to the inverse processor and configured to perform the machine learning inference by initializing the output restored frame with a pre-trained filter parameter;
an error backpropagator coupled to the first machine learning inferer and configured to calculate an error value by comparing the restored frame subjected to machine learning inference with the input original frame, backpropagate the calculated error value to the machine learning inferer according to a predetermined criterion to request the machine learning inferer to update the pre-trained filter parameter by performing the machine learning inference again, and output the updated filter parameter; and
a second machine learning inferer coupled to the error backpropagator and configured to filter the restored frame by machine learning inference based on the output filter parameter.

5. The image processing apparatus according to claim 4, wherein the machine learning in-loop filter unit further comprises a training sub-image divider coupled between the inverse processor and the first machine learning inferer and configured to divide at least one of the restored frame or the original frame into a plurality of sub-images, and
wherein the first machine learning inferer initializes each of a plurality of sub-images divided from the restored frame and subjects the initialized sub-images to machine learning inference, and the error backpropagator calculates an error value by comparing a plurality of sub-images divided from the original frame with the plurality of sub-images divided from the restored frame.

6. An image processing apparatus comprising:
a demultiplexing processor configured to extract an input stream and a filter parameter by demultiplexing an input stream received from an encoding device;
an input stream buffer configured to store the extracted input stream;
a decoding processor configured to generate an output frame by decoding the stored input stream; and
an output frame buffer configured to store the generated output frame,
wherein the decoding processor generates the output frame processed to have an improved image quality by applying the extracted filter parameter to a restored frame,
wherein the encoding device includes a machine learning in-loop filter unit configured to train a filter that converts a restored frame into the original frame before the image quality is distorted by encoding process, based on machine learning,
wherein the machine learning in-loop filter unit trains a filter parameter that minimizes differences between the original frame and the restored frame based on the machine learning performed by a codec in the encoding process and transmit directly the trained filter parameter to an entropy encoder in the encoding device, and
wherein the encoding device multiplexes and transmits the filter parameter trained based on machine learning using the stored original frame and a restored frame obtained by encoding the original frame.

7. The image processing apparatus according to claim 6, wherein the decoding processor comprises:
an entropy decoding processor configured to entropy-decode and output the received input stream;
an inverse processor coupled to the entropy decoding processor and configured to inverse-quantize and inverse-transform the entropy-decoded stream; and
a machine learning in-loop filter unit coupled to the inverse processor and configured to receive the inverse-quantized and inverse-transformed stream, a stream obtained by reflecting prediction information in the inverse-quantized and inverse-transformed stream, and the entropy-decoded stream and subject the received streams to machine learning in-loop-based filtering.

8. The image processing apparatus according to claim 7, wherein the machine learning in-loop filter unit comprises:
a parameter information decoding processor coupled to the inverse processor and configured to decoder the filter parameter;
a parameter decider coupled to the parameter information decoding processor and configured to select a filter parameter for machine learning in consideration of the difference between the extracted filter parameter and a pre-trained filter parameter; and
a machine learning inferer coupled to the parameter decider and configured to process the restored frame stored in a restored frame buffer to have an improved image quality by applying the selected filter parameter to the restored frame.

9. An image processing apparatus comprising:
an encoding processor configured to encode an input original frame;
an output stream buffer configured to output the encoded original frame as an output stream for multiplexing; and
a multiplexing processor configured to control the output stream to be multiplexed and provided to a storage medium, wherein the encoding processor includes a machine learning in-loop filter unit configured to train a filter that converts a restored frame into the original frame before an image quality is distorted by encoding process, based on machine learning, wherein the machine learning in-loop filter unit trains a filter parameter that minimizes differences between the original frame and the restored frame based on the machine learning performed by a codec in the encoding process and transmit directly the trained filter parameter to an entropy encoder in the encoding processor, wherein the encoding processor reflects adjacent feature information within a reference distance as prediction information in the stored original frame, transforms and quantizes the frame with the prediction information reflected therein, entropy-encodes and outputs the transformed and quantized frame, generates a restored frame corresponding to the original frame by inverse-transforming and inverse-quantizing the transformed and quantized frame, outputs a filtered restored frame and a trained filter parameter by receiving the original frame stored in an input frame buffer and the generated restored frame, and subjecting the original frame and the restored frame to machine learning inference, and outputs a filter parameter trained based on machine learning using the stored original frame and a restored frame obtained by the encoding, and wherein the storage medium decodes the output stream by using the output filter parameter, and extracts the input stream and the filter parameter by demultiplexing a received input stream.

10. A method of operating an image processing apparatus, the method comprising:
storing an input original frame by an input frame buffer;
encoding the stored original frame by an encoding processor;
outputting the encoded original frame as an output stream for multiplexing by an output stream buffer; and
controlling the output stream to be multiplexed and transmitted by a multiplexing processor,
wherein the encoding comprises:
training a filter that converts a restored frame into the original frame before an image quality is distorted by encoding process, based on machine learning,
outputting a filter parameter trained based on machine learning using the stored original frame and a restored frame obtained by the encoding, wherein the filter parameter that minimizes differences between the original frame and the restored frame is trained based on the machine learning performed by a codec in the encoding process and transmit directly the trained filter parameter to an entropy encoder in the encoding processor, and
wherein a device on a decoding side decodes the output stream by using the output filter parameter.

11. The method according to claim 10, wherein the encoding comprises:
reflecting adjacent feature information within a reference distance as prediction information in the stored original frame;
transforming and quantizing the frame with the prediction information reflected therein;
entropy-encoding and outputting the transformed and quantized frame;
generating a restored frame corresponding to the original frame by inverse-transforming and inverse-quantizing the transformed and quantized frame; and
outputting a filtered restored frame and a trained filter parameter by receiving the original frame stored in the input frame buffer and the generated restored frame and subjecting the original frame and the restored frame to machine learning inference, and
wherein the output restored frame is reflected in the prediction information, and the output filter parameter is transmitted to the decoding side.

12. The method according to claim 11, wherein the outputting of a filtered restored frame and a trained filter parameter comprises:
performing the machine learning inference by initializing the output restored frame with a pre-trained filter parameter;
calculating an error value by comparing the restored frame subjected to machine learning inference with the input original frame;
requesting update of the pre-trained filter parameter through machine learning inference again by back-propagating the calculated error value according to a predetermined criterion;
outputting the updated filter parameter; and
filtering the restored frame by machine learning inference based on the output filter parameter.

13. The method according to claim 12, wherein the requesting of update of the pre-trained filter parameter comprises:
when the calculated error value is equal to or larger than a threshold, requesting update of the pre-trained filter parameter by backpropagating the calculated error value, or
when the calculated error value is less than the threshold, requesting output of the updated filter parameter.

* * * * *